United States Patent [19]

Jaeschke et al.

[11] 4,379,198

[45] Apr. 5, 1983

[54] COMPOSITE MATERIAL CONTAINING A THERMOPLASTIC SYNTHETIC RESIN LAYER

[75] Inventors: Hans Jaeschke, St.-Augustin; Paul Spielau, Troisdorf-Eschmar; Horst Ulb, Troisdorf-Sieglar, all of Fed. Rep. of Germany

[73] Assignee: Dynamit Nobel Aktiengesellschaft, Troisdorf, Fed. Rep. of Germany

[21] Appl. No.: 302,615

[22] Filed: Sep. 15, 1981

[30] Foreign Application Priority Data

Oct. 1, 1980 [DE] Fed. Rep. of Germany ....... 3036994

[51] Int. Cl.³ .................. B32B 27/04; B32B 31/08; B32B 31/12; B32B 31/20
[52] U.S. Cl. ......................... 428/288; 156/176; 156/322; 156/324; 206/524.2; 428/35; 428/36; 428/290; 428/340; 428/341; 428/421; 428/483
[58] Field of Search ............... 428/35, 36, 280, 287, 428/288, 290, 483, 421; 206/524.2; 156/176, 322, 324

[56] References Cited

U.S. PATENT DOCUMENTS 3,922,186 11/1975 Segawa ........................... 428/424
3,993,827 11/1976 Duckert et al. ................. 428/421
4,054,711 10/1977 Botsolas ......................... 428/421
4,208,462 6/1980 Douphin et al. ................ 428/421

FOREIGN PATENT DOCUMENTS 19754 9/1980 European Pat. Off. .
56-13337 2/1981 Japan ............................. 428/421
1526384 9/1978 United Kingdom .
2021041 11/1979 United Kingdom .
1561430 2/1980 United Kingdom .

OTHER PUBLICATIONS

*Chemical Abstracts*: 79-6406.

*Primary Examiner*—James C. Cannon
*Attorney, Agent, or Firm*—Antonelli, Terry & Wands

[57] ABSTRACT

A composite material, especially suitable for chemical apparatus construction is formed of a layer of a thermoplastic synthetic resin and a textile layer pressed onto the resin layer in the heated condition. The textile layer is a mechanically prestrengthened, polyester fiber mat bound chemically with a binder consisting of a synthetic resin dispersion of polymers and/or copolymers of esters of acrylic and methacrylic acid and of acrylonitrile. Needling is a preferred procedure for mechanically prestrengthening the mat.

7 Claims, 1 Drawing Figure

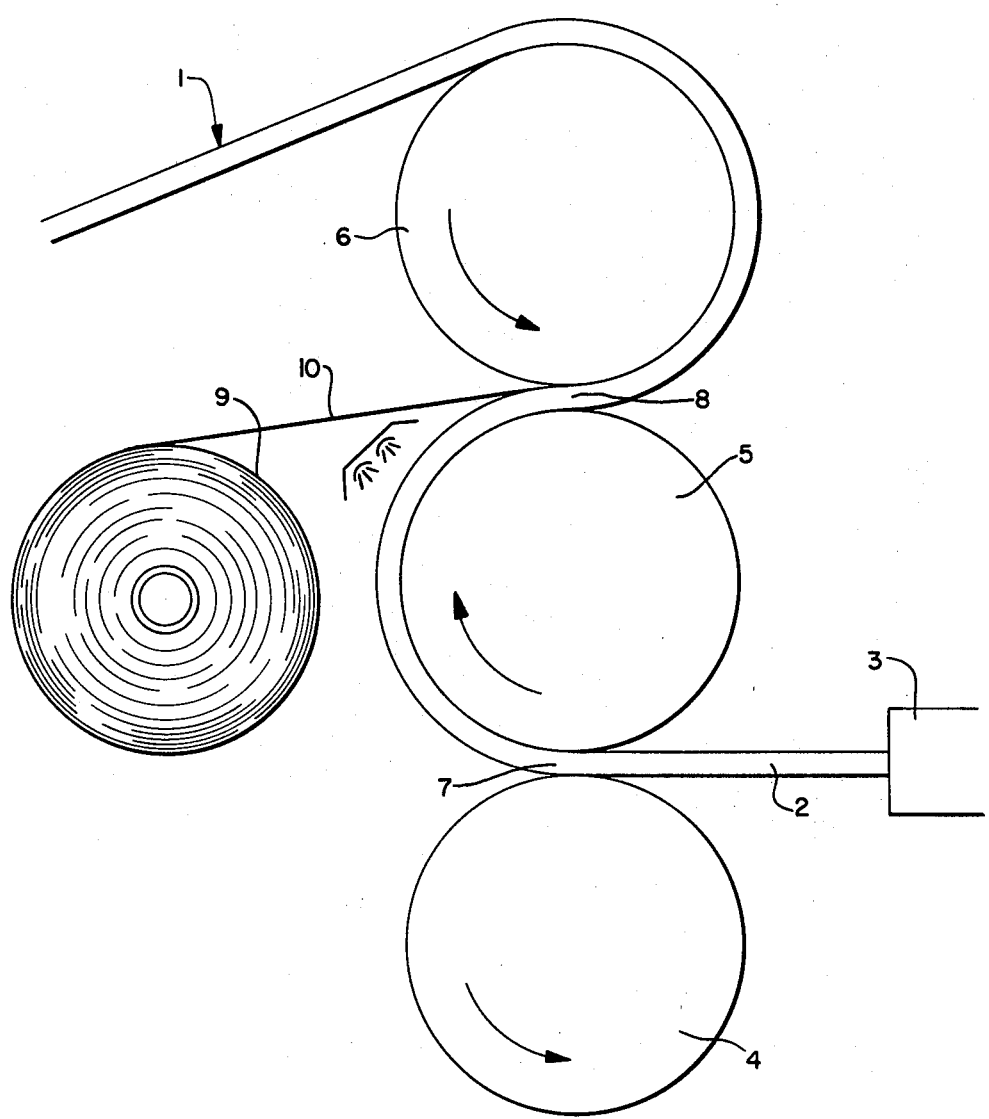

COMPOSITE MATERIAL CONTAINING A THERMOPLASTIC SYNTHETIC RESIN LAYER

This invention relates to a composite material, especially suitable for chemical apparatus construction, containing a layer of a thermoplastic synthetic resin and a textile layer, especially a polyester fiber mat, pressed onto the resin layer in the heated condition, and to a method of producing such composite material.

In the construction of synthetic resin apparatus and pipelines, composite constructions of several materials are increasingly utilized to satisfy, on the one hand, the demands for mechanical rigidity and strength and, on the other hand, for example, chemical resistance requirements. In the construction of chemical apparatuses, tanks are frequently covered on the inside with a liner of a thermoplastic synthetic resin which can be welded together at the joints; whereas the outside is strengthened by glass-fiber-reinforced synthetic resin laminates. If the liner consists of polyethylene or polypropylene or, in recent times, of polyvinylidene fluoride, an adhesion-promoting intermediate layer is necessary for bonding the glass-fiber-reinforced synthetic resin laminate to the liner. Conventional intermediate layers are herein fiber substrates, either woven or nonwoven, from natural, artificial, or synthetic fibers, such as glass fibers or synthetic resin fibers which are pressed into one surface side already during the manufacture of the panel-shaped thermoplastic liners. Fabrics or mats consisting primarily of glass fibers exhibit good adhesion to the glass-fiber-reinforced plastic, but on the other hand entail the disadvantage that they do not permit shaping of the composite due to brittleness of the glass fibers.

Fiber substrates made up of synthetic resin fibers have been used as the intermediate layer in place of glass fiber fabrics, but these substrates have the drawback that the attainable peeling resistance of the composite is considerably lower, as compared with glass fiber fabrics, and does not always meet the posed high requirements in apparatus construction.

On the other hand, polyester fiber mats have been used as the intermediate layer, since they are moldable and make it possible to shape the flat composite material in the warm state, for example into so-called dished boiler ends. The disadvantages of glass fibers are avoided, and they are likewise immune to rotting. Yet, the problem persists how to attain adequate adhesive strength.

Numerous attempts have, therefore, been made to improve the adhesive bond between the thermoplastic synthetic resin liner and the adhesion-promoting fiber substrate; in this connection, attention is invited to DOS (German Unexamined Laid-Open Application) No. 2,713,754 and DOS No. 2,655,597, describing the problem in regard to polyvinylidene fluoride. The aforementioned German applications utilize, to raise the bonding strength between the fiber substrate of a synthetic resin and the thermoplastic liner, solvent-containing adhesives containing synthetic resin and furthermore solutions of a non-fluorinated polymer or copolymer in an aprotic polar solvent, respectively with the additional use of heat to produce the composite.

DAS (German Published Application) No. 2,922,352 discloses a process for the firm bonding of a flat article made of a thermoplastic synthetic resin to a deformable polyester fiber mat, wherein the polyester fiber mat is applied to at least one side of the flat article, which article is in the plastic or approximately plastic condition, with the use of pressure, and is anchored in place by subsequent cooling. In this process, a layer of synthetic resin powder of 20–100 g/m$^2$ made of the same synthetic resin as the flat article is uniformly applied to one side of the polyester fiber mat and sintered at a temperature of between 100° and 250° C. and cooled, whereupon the thus-sintered side of the polyester fiber mat is bonded continuously to the flat article by rolling. The thermoplastic synthetic resins employed are polyvinylidene fluoride, polypropylene, and polyethylene. Although this process results in improved adhesive strengths of the composite material as compared with the use of polyester fiber mats without a sintered layer, as described, for example, in DOS No. 2,818,385 and DOS No. 2,918,923 for polyvinylidene fluoride, it is necessary to carry out the additional process step of providing the sintered layer.

The problem still exists of improving the obtainable values for the adhesive strength between the synthetic resin layer and the textile layer and making it possible at the same time to utilize maximally simple manufacturing processes for economical reasons.

It has been found surprisingly that this problem can be solved by providing a mechanically prestrengthened, especially needled polyester fiber mat bound chemically with a thermoplastic synthetic resin dispersion based on polymers and/or copolymers of esters of acrylic and/or methacrylic acid and acrylonitrile, with the result of very satisfactory improvements in the properties of the composite material.

It is generally known to bond mat or fleece materials, optionally after prestrengthening, by mechanical methods, inter alia by gluing with the aid of a binder, see, for example *Ullmanns Enzyklopaedie der technischen Chemie (Ullmann's Encyclopedia of Technical Chemistry)* 3rd Edition, Vol. 17 (1966), pp. 287-299. Suitable binders are water-soluble binders such as starch, cellulose derivatives, viscose, inter alia, or elastomers, such as synthetic rubber latices containing butadiene-styrene copolymer, butadiene-acrylonitrile copolymer, etc., or thermoplastics, such as aqueous dispersions of acrylic ester copolymers, self-crosslinking polyacrylic acid esters, vinyl polymers, e.g. polyvinyl acetate, polyvinyl chloride, and the copolymers thereof, etc.

It was found as a surprising feature of this invention that a composite material having high bonding strength values is obtained only by the polyester fiber mats, e.g. mats of polyethylene terephthalate, which are mechanically prestrengthened and bound chemically with a binder of a synthetic resin aqueous dispersion of a polymer of an acrylic or methacrylic acid ester and/or a copolymer of the ester with acrylonitrile, and combined with a layer which may be formed of a number of thermoplastic synthetic resins, especially polyvinylidene fluoride, polyolefins, especially polyethylene and polypropylene. The solid contents of these dispersions usually range between 10 and 60 weight %. This composite is achieved exclusively by pressing the polyester fiber mat into the heated synthetic resin layer, e.g. sheet, film, or the like. It could not be foreseen that the posed problem could be solved solely by the use of polyester fiber mats which are bound chemically on the basis of acrylates; whereas merely needled polyester staple fiber mats and/or polyester staple fiber mats with elastomeric binders, e.g. on the basis of butadiene-styrene and also thermoplastic binders on the basis of vinyl polymers proved to be unsuitable, as will be shown by the following examples.

A polyester fiber mat having a weight per unit area of 100–350 g/m$^2$ with a content of binder of 10–50% of the total dry weight per unit area of polyester fiber mat is preferably utilized for the composite material of this invention. The use of heat-set polyester fiber mats proves to be of special advantage according to the invention, since these mats are no longer subject to shrinkage during lamination with the use of heat. By the production of a composite from the polyester fiber mat used according to this invention and synthetic resin layers, the bonding strengths attainable can be increased by up to 100% and thereabove as compared with the other textile layers and mats. In this connection, the bonding strength values are even attained which are produced by the sintering step according to DAS No. 2,922,352 in polyvinylidene fluoride composites. This does not only hold true for room temperature, but also for higher temperatures to which such composite materials of this invention are exposed during practical use.

The invention can be applied with special advantage to the thermoplastic synthetic resins on the basis of polyvinylidene fluoride, polypropylene, and propylene copolymers, based on at least 90% by weight of propylene and up to 10% by weight of ethylene or butene as well as polyethylene (low-density polyethylene, high-density polyethylene) used in apparatus construction, wherein it is possible to provide flat articles made solely of plastic as well as those made from molding compositions on the basis of the aforementioned synthetic resins with the addition of auxiliary agents, fillers, pigments, etc. The process of this invention can be used with particular advantage if the bonding of the flat article of a synthetic resin to the polyester fiber mat takes place continuously by means of rolls, there being a relatively short dwell time in the roll nip to apply the bonding pressure. Such a laminating step can be executed, for example, directly after an extruder for the extrusion of the flat article, e.g. a sheet, film, panel or the like, from the thermoplastic synthetic resin, so that the polyester fiber mat is embedded into the flat article still warm from the extrusion step. It can also be advantageous to preheat the polyester fiber mat for the laminating procedure.

The polyester fiber mat used according to this invention apparently is also so rugged, due to its binder, that it is only slightly stretched during lamination to the synthetic resin layer which layer is still in an approximately plastic condition—in contrast, for example, to chemically unbound mats—so that it retains its full extensibility for subsequent shaping steps to which the composite material may be subjected. In particular, however, the type of binder selected for the polyester fiber mat permits a preheating of the polyester fiber mat whereby the laminating step can be improved and the thus-attainable bonding strength values can be even further raised.

Especially suitable as fibers for the mats are thermoplastic, linear polyesters on the basis of terephthalic acid, e.g. polyethylene terephthalate and polybutylene terephthalate.

The mats are produced, for example, by needling polyester staple fibers so that the mats exhibit a high strength with a simultaneous good elongation value. Such mats exhibit an extensively texture-free mat surface, so that the advantage is obtained furthermore, also on account of the thermoplastic properties, that the mat structure will hardly be impressed on the facing-away surface of the flat article, i.e. the opposite surface, during the production of the bond with the thermoplastic flat article. It is thus possible to bond even relatively thin-walled flat articles, especially films or sheets or panels of polyvinylidene fluoride, polypropylene, or polyethylene to the polyester fiber mat, without any texturing being noticeable on the side of the flat article opposite to the mat. It is thereby made possible to use even for apparatus construction flat synthetic resin articles having a relatively minor thickness, starting with 1.0 mm, whereby expenses for material can be saved, especially in case of the costly materials such as polyvinylidene fluoride, and the required mechanical rigidity is provided, for example, by the additional bond with glass-fiber-reinforced synthetic resins.

The production of thermoplastic flat articles on the basis of polyvinylidene fluoride, polypropylene, or polyethylene, laminated on one side or on both sides with a polyester fiber mat, is performed with the objective in mind to bond these flat articles of a synthetic resin to additional materials for reinforcing purposes, contemplating, in particular, additional materials such as glass-fiber-reinforced unsaturated polyester resins. Since the direct bond between the initally described flat articles of polyvinylidene fluoride, polypropylene, or polyethylene to glass-fiber-reinforced unsaturated polyester resins is impossible, the polyester fiber mat acts as an intermediate layer; in this regard, the bonding strengths attainable by joining the polyester fiber mat, on the one hand, to the flat article and, on the other hand, to the fiber-reinforced synthetic resin determine in total the mechanical properties of the entire composite. In this connection, the polyester fiber mats used according to the invention exhibit, as compared with other types of polyester fiber mats, an increased absorbability for unsaturated polyester resins, whereby the unsaturated polyester resin can be applied more easily.

Practically all conventional, glass-fiber-reinforced unsaturated polyester resins are suitable for the production of a shaped reinforced composite article using the composite material of this invention; in this connection, attention is invited to the information relating to unsaturated polyester resins in *Kunststoff-Taschenbuch (Plastics Pocketbook)* 20th Edition by H. J. Sechtling, Carl Hanser Publishers, Munich, Vienna (1977), pp. 384–388. The glass fiber proportion will usually be between 20% and 50% by weight, based on the weight of the glass-fiber-reinforced unsaturated polyester resin. The composite materials of this invention can also be used advantageously for the lining of steel tanks and concrete basins.

The polyester fiber mat used according to this invention also has a positive effect if the composite material is heat-sealed or welded later on, for example, since this polyester fiber mat does not shrink away on account of the heat from the welding seam and also is hardly melted.

The invention will be explained in greater detail with reference to the drawing and the following examples.

The sole FIGURE is a schematic view of a preferred manufacturing method for the composite material 1.

In a continuous mode of operation, the synthetic resin sheet 2 is extruded with the extruder 3 and fed to a smoothing calender, for example comprising three rolls 4, 5, 6. The synthetic resin sheet 2 first passes through the roll nip 7 formed between the rolls 4 and 5. The polyester fiber mat 9 is introduced only in the subsequent roll nip 8 formed between the rolls 5, 6, and is laminated to the sheet 2. Advantageously, the surface of the synthetic resin sheet 2 is reheated by a heating device, such as IR radiators 10, to a surface temperature of from about 100° C. to 300° C., which is adjusted depending on the hardness of the utilized binder before passing into the roll nip 8; during this step, preheating of the polyester fiber mat 9 occurs simultaneously due to the heat accumulation forming upstream of the roll nip 8.* Surprisingly, this simple process results in a very good lamination in the composite material 1 obtained from synthetic resin sheet 2 and polyester fiber mat 9.

*During operation the upper roll 6, which typically has as a length of 1,20 m, is adjusted with a pressure of about 4 to 6 bar against the composite material in the roll nip 8 by two pneumatic cylinders, which act in vertical direction on both ends of the horizontal axis of roll 6.

The following examples illustrate the composite material according to this invention and the mechanical bonding strengths attainable thereby as compared with the use of other textile layers. The thermoplastic synthetic resin layer and the textile layer are bonded in each case continuously by means of rolls as illustrated. Measurements were conducted with regard to the end pull-off strength according to DIN (German Industrial Standard) No. 53 397; the compressive shear strength; and the peeling resistance according to British Standards BS No. 4994/C 11. To measure the compressive shear strength, a composite material to be tested is glued to a prefabricated, glass-fiber-reinforced unsaturated polyester (UP) resin plate having a thickness of 4 mm on both sides thereof, using a slight contact pressure of 0.01 N/mm². After curing, the test specimen is tested on a tensile strength testing machine with an advance of 10 mm/min, the centrally located UP resin plate being urged out of the test specimen. Test specimens are also prepared for measuring the end pull-off strength and the peeling resistance; in this case, the composite material is covered on its textile side with an unsaturated polyester resin, whereafter the test specimens are produced. The test specimens for measuring the end pull-off strength at 23° C., the compressive shear strength at 23° C., and the peeling resistance at 23° C., were produced, respectively, with an unsaturated polyester resin having the composition of 100 parts by weight of "Leguval" W 16 BAYER AG
3 parts by weight of benzoyl peroxide
2 parts by weight of an amine accelerator 10% (dimethylaniline solution), and the remaining end pull-off strength tests were conducted with the use of a polyester resin "Leguval" W 45 stable at higher temperatures, in place of "Leguval" W 16, wherein the following composition was selected 100 parts by weight of "Leguval" W 45 BAYER AG
2 parts by weight of methyl ethyl ketone peroxide
1.5 parts by weight of cobalt accelerator CA 12 (Peroxydchemie)
0.5 part by weight of inhibitor +C 510 (Peroxydchemie)

EXAMPLE 1

Composite material made up of a polyvinylidene fluoride plate, thickness 4 mm, and a needled polyester staple fiber mat, not bound chemically, with a weight per unit area of 150 g/m² (comparative example); for test results see table.

EXAMPLE 2

Composite material made up of a polyvinylidene fluoride plate, thickness 4 mm, with a glass fiber fabric of a weight per unit area of 400 g/m² (comparative example); for test results see table.

EXAMPLE 3

Composite material made up of a polyvinylidene fluoride plate, thickness 4 mm, with a needled and heat-set polyester fiber mat chemically bound according to this invention with an aqueous ethyl acrylate dispersion, weight per unit area 250 g/m² with a binder proportion of 40 g/m²; for test results see table.

EXAMPLE 4

Composite material made up of a polyvinylidene fluoride plate, thickness 4 mm, with a needled polyester fiber mat chemically bound on the basis of styrene-butadiene rubber, with a weight per unit area of 200 g/m² and with a binder proportion of 40 g/m² (comparative example); for test results see table.

EXAMPLE 5

Composite material made up of a polypropylene plate, thickness 4 mm, with a polyester fiber mat according to Example 1 (comparative example); for test results see table.

EXAMPLE 6

Composite material made up of a polypropylene plate, thickness 4 mm, with a glass fiber fabric according to Example 2 (comparative example); for test results see table.

EXAMPLE 7

Composite material made up of a polypropylene plate, thickness 4 mm, with a polyester fiber mat chemically bound according to this invention as per Example 3; for test results see table.

EXAMPLE 8

Composite material made up of a polypropylene plate, thickness 4 mm, with a polyester fiber mat according to Example 4 (comparative example); for test results see table.

EXAMPLE 9

*It can clearly be seen from the tests that the composite materials with the use of polyester fiber mats constructed according to this invention exhibit higher bonding strength values, even at elevated temperatures, as compared with the textile layers customarily employed heretofore—a result which could not be expected and which is of paramount significance in the field of use under consideration.

*Composite material made up of a polyvinylidene fluoride plate, thickness 4 mm, with a needled and heat-set polyester fiber mat chemically bound according to this invention with an aqueous dispersion based on a mixture of one part (by weight) of an n-butyl acrylate and two parts of an ethyl methacrylate, weight per unit area 250 g/m² with a binder proportion of 40 g/m²; for test results see table.

TABLE

| Example | End Pull-Off Strength (N/mm²) | | | | Compressive Shear Strength (N/mm²) | Peeling Resistance According to British Standards (N/mm) |
|---|---|---|---|---|---|---|
| | 23° C. | 80° C. | 100° C. | 120° C. | 23° C. | 23° C. |
| 1 | 3.2 | 1.5 | — | 1.1 | 12.0 | 14.0 |
| 2 | 5.0 | 3.0 | — | 1.6 | 10.0 | 14.5 |
| 3 | 9.3 | 6.0 | — | 2.8 | 11.0 | 26.0 |
| 4 | 7.0 | 3.5 | | 1.8 | 11.0 | 15.0 |
| 5 | 3.9 | 3.2 | 2.8 | — | 8.0 | 18.5 |
| 6 | 4.5 | 2.4 | 2.4 | — | 9.0 | 14.0 |
| 7 | 5.5 | 3.9 | 3.4 | — | 13.0 | 32 |
| 8 | 4.7 | 3.3 | 3.0 | | 11.0 | 15.0 |
| 9 | 8.7 | 5.6 | — | 2.4 | 11.0 | 24.2 |

What is claimed is:

1. A composite material, especially suitable for chemical apparatus construction comprising a layer of a thermoplastic synthetic resin and a textile layer pressed onto the resin layer in the heated condition; said textile layer consisting of a mechanically prestrengthened, polyester fiber mat bound chemically with a binder consisting essentially of a synthetic resin dispersion of polymers of acrylic or methacrylic acid esters and/or copolymers of esters of acrylic or methacrylic acid and of acrylonitrile.

2. A composite material according to claim 1, wherein the polyester fiber mat has a weight per unit area of 100-350 g/m² with a proportion of binder of 10-50% of the weight per unit area.

3. A composite material according to claim 1 or 2, wherein the polyester fiber mat is heat-set before being laminated to the resin layer.

4. A composite material according to claim 1 or 2, wherein the thermoplastic synthetic resin layer consists of a polyolefin comprising low-density polyethylene, high-density polyethylene or polypropylene.

5. A composite material according to claim 1 or 2, wherein the thermoplastic synthetic resin layer consists of polyvinylidene fluoride.

6. A composite material according to claim 1, wherein the polyester mat is reinforced by needling the fiber together prior to application of the binder.

7. A method for producing a composite material which comprises chemically bonding the fibers of a polyester fiber mat which has been needled with a binder consisting essentially of a dispersion of polymers of acrylic or methacrylic acid esters and/or copolymers of esters of acrylic acid or methacrylic acid and acrylonitrile, and thereafter laminating the polyester mat to a layer of a synthetic resin by application of heat and pressure.

* * * * *